(12) United States Patent
Chen et al.

(10) Patent No.: US 7,101,927 B2
(45) Date of Patent: Sep. 5, 2006

(54) LATEX OBTAINABLE BY A GRADIENT REGIME REACTION

(75) Inventors: Jinqiu Chen, Marl (DE); Sabine Hahn, Haltern am See (DE); Hans-Peter Schwenzfeier, Dorsten (DE); Jens Wieboldt, Marl (DE)

(73) Assignee: Sternagel Fleischer Godemeyer & Partner, Bergisch Gladbach (DE)

( * ) Notice: Subject to any disclaimer, the term of this patent is extended or adjusted under 35 U.S.C. 154(b) by 364 days.

(21) Appl. No.: 10/681,091

(22) Filed: Oct. 9, 2003

(65) Prior Publication Data

US 2004/0072945 A1    Apr. 15, 2004

(30) Foreign Application Priority Data

Oct. 9, 2002    (DE) ................................ 102 47 051

(51) Int. Cl.
*C08K 3/00*    (2006.01)
(52) U.S. Cl. .................. 524/457; 524/800; 526/78; 526/79; 526/87; 526/88; 526/213
(58) Field of Classification Search ................. 526/78, 526/79, 87, 88, 213; 523/352; 524/457, 524/800
See application file for complete search history.

(56) References Cited

U.S. PATENT DOCUMENTS

| | | | | |
|---|---|---|---|---|
| 3,804,881 A | * | 4/1974 | Basset et al. ................. | 526/80 |
| 4,212,785 A | * | 7/1980 | Turck .......................... | 524/745 |
| 5,006,592 A | * | 4/1991 | Oshima et al. ............. | 524/504 |
| 5,756,573 A | * | 5/1998 | Trumbo et al. ............. | 524/458 |
| 6,331,598 B1 | * | 12/2001 | Park et al. ..................... | 526/87 |
| 6,337,359 B1 | * | 1/2002 | Diehl et al. ................. | 523/201 |
| 6,451,899 B1 | * | 9/2002 | Zhao et al. ................. | 524/501 |
| 6,538,057 B1 | * | 3/2003 | Wildburg et al. ........... | 524/460 |
| 2003/0125459 A1 | * | 7/2003 | Wulff et al. ................ | 524/800 |
| 2004/0171728 A1 | * | 9/2004 | Xue et al. ................... | 524/420 |

\* cited by examiner

*Primary Examiner*—Vasu Jagannathan
*Assistant Examiner*—Sandra Poulos
(74) *Attorney, Agent, or Firm*—Oblon, Spivak, McClelland, Maier & Neustadt, P.C.

(57) ABSTRACT

A latex having a reduced amount of 4-phenylcyclohexene is obtainable by reacting A) 30–90% by weight of at least one ethylenically unsaturated monomer; B) 70–10% by weight of a diene; C) 1–10% by weight of α,β-unsaturated carboxylic acids, carboxylic acid nitriles, carboxylic acid amides, or mixtures thereof; and D) an auxiliary, an additive or mixtures thereof. The reaction follows a gradient regime for components A and B.

28 Claims, No Drawings

LATEX OBTAINABLE BY A GRADIENT REGIME REACTION

BACKGROUND OF THE INVENTION

1. Field of the Invention

The present invention relates to a latex obtainable by reaction in a gradient regime in which the initial molar ratio of the entering components is adjusted to a target molar ratio through at least one discontinuous change in the amount fed in per unit time.

2. Discussion of the Background

Emulsion polymerization conducted with monomer mixtures which are capable of side reactions (e.g., Diels-Alder reaction) yield side-products which occur as accompaniments in the latex. Since these substances have a strong intrinsic odor, efforts have been made to minimize the amount of these side-products.

U.S. Pat. No. 3,804,881 discloses emulsion polymerization with a permanently varying monomer ratio of the entering polymerizing components. In that process the variation in the amount added per unit time is kept permanently constant. A disadvantage of the process is that during the polymerization large amounts of by-products, especially Diels-Alder products, are formed. No specific methods are indicated for reducing the level of accompaniments.

EP 0 853 636 B1 describes emulsion polymerization using a seed latex, performed by the feed technique, with a continuous variation of the monomer ratio of the entering polymerizing components. In that case, the variations in the amount added per unit time are kept constant throughout the metering time of the two monomer mixtures. A disadvantage of the process is that during the polymerization large amounts of by-products, especially Diels-Alder products are formed. No specific methods are indicated for reducing the level of accompaniments.

SUMMARY OF THE INVENTION

It is an object of the present invention to provide a carboxylated ene-diene latex, especially a styrene-butadiene latex, containing a reduced amount of 4-phenylcyclohexene (4-PCH).

This object has been achieved by the introduction of a discontinuity gradient during the preparation.

Accordingly, one embodiment of the present invention includes a latex, obtainable by reacting A) 30–90% by weight of at least one ethylenically unsaturated monomer;

B) 70–10% by weight of a diene;

C) 1–10% by weight of α,β-unsaturated carboxylic acids, carboxylic acid nitrites, carboxylic acid amides, or mixtures thereof; and D) at least one auxiliary, at least one additive or mixtures thereof;

wherein a sum of A, B and C is 100% by weight;

wherein said reacting follows a gradient regime for components A and B;

wherein, in said gradient regime, an amount added per unit time of one of components A or B continuously increases, while simultaneously an amount added per unit time continuously decreases for one of components A or B which does not undergo the continuous increase;

with the proviso that a starting molar ratio of A to B is adjusted from a range of 0.15–0.95 or 1.05–6.66 through at least one discontinuous change in the amount added per unit time to a target molar ratio of A to B, in the range of 1.05–6.66 or 0.15–0.95, and thereafter the change in the amount added per unit time is made i) constantly for A and B, and/or ii) decreasingly for A and ascendingly for B, and/or iii) decreasingly for B and ascendingly for A, in any sequence, individually or in combination.

In another embodiment the present invention relates to the process of producing the above latex.

DETAILED DESCRIPTION OF THE INVENTION

The present invention provides a latex obtainable by reacting

A) 30–90% by weight of at least one ethylenically unsaturated monomer,

B) 70–10% by weight of diene,

C) 1–10% by weight of α,β-unsaturated carboxylic acids and/or carboxylic acid nitrites and/or carboxylic acid amides, D) at least one auxiliary, at least one additive or mixtures thereof, wherein the sum A–C is 100% by weight, by a gradient regime governing components A and B. This means a continuous increase with simultaneous continuous decrease in the amount added per unit time of one of the two components, with the proviso that the molar ratio of the entering components, A to B, is adjusted from a range between 0.15–0.95 or 1.05–6.66 through at least one discontinuous change in the amount fed in per unit time to a molar ratio of the entering components A to B, in the range of 1.05–6.66 or 0.15–0.95. Thereafter the amount added per unit time is changed i) constantly for A and B, ii) and/or decreasingly for A and ascendingly for B, iii) and/or decreasingly for B and ascendingly for A in any desired sequence, individually or in combination.

The amount of ethylenically unsaturated monomer includes all values and subvalues therebetween, especially including 35, 40, 45, 50, 55, 60, 65, 70, 75, 80, 85 and 89% by weight. The amount of diene includes all values and subvalues therebetween, especially including 15, 20, 25, 30, 35, 40, 45, 50, 55, 60, 65 and 69% by weight. The amount of component C) includes all values and subvalues therebetween, especially including 1, 2, 3, 4, 5, 6, 7, 8 and 9% by weight. The initial or the adjusted molar ratio of the entering components A to B includes all values and subvalues therebetween, especially including 0.2, 0.25, 0.3, 0.35, 0.4, 0.45, 0.50, 0.55, 0.60, 0.65, 0.70, 0.75, 0.80, 0.85 and 0.90 or 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4 and 6.5. In a preferred embodiment A), B) and C) are present in the following ratios: A) 30–89% by weight, B) 69–10% b y weight and C) 1–10% by weight. Preferably, component C) and/or B) are different from component A).

The present invention further provides a process for preparing a latex obtainable by reacting A) 30–90% by weight of at least one ethylenically unsaturated monomer, B) 70–10% by weight of diene, C) 1–10% by weight of α,β-unsaturated carboxylic acids and/or carboxylic acid nitrites and/or carboxylic acid amides, D) at least one auxiliary, at least one additive, or mixtures thereof, wherein the sum A–C is 100% by weight, by a gradient regime governing components A and B. This means continuous increase with simultaneous continuous decrease in the amount added per unit time of one of the two components, with the proviso that the molar ratio of the entering components, A to B, is adjusted from a range between 0.15–0.95 or 1.05–6.66 through at least one discontinuous change in the amount fed in per unit time to a molar ratio of the entering components A to B, in the range of 1.05–6.66 or 0.15–0.95, and thereafter the change in the amount added per unit time is made i) constantly for A and B,
ii) and/or decreasingly for A and ascendingly for B,
iii) and/or decreasingly for B and ascendingly for A in any desired sequence, individually or in combination.

The amount of ethylenically unsaturated monomer includes all values and subvalues therebetween, especially including 35, 40, 45, 50, 55, 60, 65, 70, 75, 80, 85 and 89% by weight. The amount of diene includes all values and subvalues therebetween, especially including 15, 20, 25, 30, 35, 40, 45, 50, 55, 60, 65 and 69% by weight. The amount of component C) includes all values and subvalues therebetween, especially including 1, 2, 3, 4, 5, 6, 7, 8 and 9% by weight. The initial or the adjusted molar ratio of the entering components A to B includes all values and subvalues therebetween, especially including 0.2, 0.25, 0.3, 0.35, 0.4, 0.45, 0.50, 0.55, 0.60, 0.65, 0.70, 0.75, 0.80, 0.85 and 0.90 or 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4 and 6.5. In a preferred embodiment A), B) and C) are present in the following ratios: A) 30–89% by weight, B) 69–10% by weight and C) 1–10% by weight. Preferably, component C) and/or B) are different from component A).

Preferably, component A is selected from ethylenically unsaturated monomers such as $C_2$ to $C_{20}$ alkenes, for instance, ethene, propene, 1-butene, 2-butene, isobutene, 1-pentene, 2-methyl-2-butene, 1-hexene, 4-methyl-1-pentene, 3,3-dimethyl-1-butene, 2,4,4-trimethyl-1-pentene, 6-ethyl-1-hexene, 1-heptene, 1-octene, 1-decene, 1-dodecene; functionalized vinyl compounds such as vinyl chloride, vinylidene chloride, vinylidene cyanide, vinyl fluoride, vinylidene fluoride, acrolein, methacrolein, vinyl acetate, vinyl propionate, vinyl butyrate, vinyl benzoate, vinyl butyral, vinyl chloroacetate, vinyl formate, vinyl methoxyacetate, vinyl caproate, vinyl oleate, vinyl adipate, methyl vinyl ketone, methyl α-chlorovinyl ketone, ethyl vinyl ketone, hydroxymethyl vinyl ketone, chloromethyl vinyl ketone, methyl vinyl ether, isopropyl vinyl ether, butyl vinyl ether, 2-ethylhexyl vinyl ether, 2-methoxy ethyl vinyl ether, 2-chloroethyl vinyl ether, methoxyethoxyethylvinyl ether, hydroxyethyl vinyl ether, aminoethyl vinyl ether, α-methylvinyl methyl ether, divinyl ether, divinyl ethers of ethylene glycol or diethylene glycol or triethanolamine cyclohexylvinyl ether, benzyl vinyl ether, phenethyl vinyl ether, cresyl vinyl ether, hydroxyphenyl vinyl ether, chlorophenyl vinyl ether, naphthyl vinyl ether, vinyl ethyl sulfide, divinyl sulfide, vinyl-p-tolylsulfide, divinyl sulfone, vinyl ethyl sulfone, vinyl ethyl sulfoxide, vinylsulfonic acid, sodium vinylsulfonate, vinyl benzamide, vinyl pyridine, N-vinylpyrrolidone, N-vinylcarbazole, N(vinylbenzyl)pyrrolidine, N-(vinylbenzyl)piperidine, 1-vinylpyrene, 2-isopropenylfuran, 2-vinyldibenzofuran, 2-methyl-5-vinylpyridine, 3-isopropenylpyridine, 2-vinylpiperidine, 2-vinylquinoline, 2-vinylbenzoxazole, 4-methyl-5-vinylthiazole, vinylthiophene, 2-isopropenylthiophene, 1-chloroethyl vinyl sulfide, vinyl-2-ethoxyethyl sulfide, vinyl phenyl sulfide, vinyl-2-naphthyl sulfide, divinyl sulfoxide, vinyl phenyl sulfoxide, vinyl chlorophenyl sulfoxide, methyl vinylsulfonate, vinyl sulfoanilide; $C_5$ to $C_{20}$ alkadienes having isolated double bonds such as 1,4-pentadiene, 1,4-hexadiene, 1,5-hexadiene, 2-methyl-1,4-pentadiene; $C_5$ to $C_{20}$ alkatrienes having isolated double bonds such as 1,2,5-hexatriene, divinylacetylene; $C_5$ to $C_{20}$ cycloolefins such as cyclopentene, norbornene, norbornadiene, methylnorbornene, cyclohexene, indene, coumarone; vinyl-substituted aromatics such as styrene, α-chlorostyrene, α-methylstyrene, allylbenzene, vinylnaphthaline, 4-methylstyrene, 4-methoxy-3-methylstyrene, 4-chlorostyrene, 3,4-dimethyl-α-methylstyrene, 3-bromo-4-methyl-α-methylstyrene, 2,5-dichlorostyrene, 4-fluorostyrene, 3-iodostyrene, 4-cyanostyrene, 4-vinylbenzoic acid, 4-acetoxystyrene, 4-vinylbenzyl alcohol, 3-hydroxystyrene, 1,4-dihydroxystyrene, 3-nitrostyrene, 2-aminostyrene, 4-N,N-dimethylaminostyrene, 4-phenylstyrene, 4-chloro-1-vinylnaphthaline, divinylbenzene; α,β-monoethylenically unsaturated carboxylic acids, their nitriles, amides and anhydrides, such as acrylic acid, methacrylic acid, acrylonitrile, methacrylonitrile, acrylamide, methacrylamide, N,N-dimethylacrylamide, N-methylmethacrylamide, chloroacrylic acid, methylchloroacrylic acid, chloroacrylonitrile, ethacrylonitrile, N-phenylacrylamide, N,N-diethylacrylamide, N-cyclohexylacrylamide, dimethylmaleate, diethylmaleate, di(2-ethylhexyl)maleate, dimethyl fumarate, dipropyl fumarate, diamyl fumarate, maleic anhydride; $C_1$ to $C_{20}$ alkyl esters of acrylic acid or methacrylic acid such as methyl acrylate, methyl methacrylate, norbornene acrylate, norbornenyl diacrylate, 2-hydroxyethyl acrylate, trimethoxysilyloxypropyl acrylate, dicyclopentenyl acrylate, cyclohexyl acrylate, 2-isopropyl methacrylate, ethyl acrylate, methyl-α-chloro acrylate, β-dimethylaminoethyl methacrylate, ethyl methacrylate, 2-ethylhexyl acrylate, cyclohexyl methacrylate, hexyl methacrylate, 2-methylcyclohexyl methacrylate, β-bromoethyl methacrylate, butyl acrylate, butyl methacrylate, hexyl acrylate, dodecyl acrylate, 3-methyl-1-butyl acrylate, 2-ethoxyethyl acrylate, 2-methoxy ethyl acrylate, isodecyl acrylate, dichloroisopropyl acrylate, allyl acrylate, allyl methacrylate, diallyl maleate, butoxyethoxy ethyl acrylate, ethylene glycol diacrylate, ethylene glycol dimethacrylate, trimethylolpropane triacrylate, trimethylolpropane trimethacrylate, neopentyl glycol diacrylate, neopentyl methacrylate, pentaerythritol triacrylate, pentaerythritol trimethacrylate; $C_6$ to $C_{20}$ aryl esters of acrylic or methacrylic acid such as phenyl methacrylate, phenyl acrylate, benzyl methacrylate, 2-phenoxyethyl acrylate, tolyloxyethyl acrylate.

Particular preference is given to using vinyl-substituted aromatics such as styrene, α-chlorostyrene, α-methylstyrene, allylbenzene, vinylnaphthaline, 4-methylstyrene, 4-methoxy-3-methylstyrene, 4-chlorostyrene, 3,4-dimethyl-α-methylstyrene, 3-bromo-4-methyl-α-methylstyrene, 2,5-dichlorostyrene, 4-fluorostyrene, 3-iodostyrene, 4-cyanostyrene, 4-vinylbenzoic acid, 4-acetoxy styrene, 4-vinylbenzyl alcohol, 3-hydroxystyrene, 1,4-dihydroxystyrene, 3-nitrostyrene, 2-aminostyrene, 4-N,N-dimethylamino styrene, 4-phenylstyrene, 4-chloro-1-vinylnaphthaline and/or divinyl benzene.

Preferably, component B is selected from $C_4$ to $C_{20}$ dienes having conjugated double bonds such as 1,3-butadiene, isoprene, chloroprene, 1-phenyl-1,3-butadiene, cyclopentadiene, dicyclopentadiene, 1,3-hexadiene, 1,3-pentadiene, 2,4-pentadiene, 2,4-hexadiene. Particular preference is given to dienes having conjugated double bonds such as: 1,3-butadiene, isoprene, chloroprene, cyclopentadiene.

Component C is preferably selected from $C_3$ to $C_6$ α,β-monoethylenically unsaturated monocarboxylic and dicarboxylic acids, such as acrylic acid, methacrylic acid, maleic acid, fumaric acid, itaconic acid; esters of $C_3$ to $C_6$ α,β-monoethylenically unsaturated monocarboxylic and dicarboxylic acids with $C_1$ to $C_{12}$ alkanols such as methyl, ethyl, n-butyl, isobutyl and 2-ethylhexyl esters of acrylic acid or methacrylic acid, dimethyl, diethyl, di-n-butyl, diisobutyl, and di(2-ethylhexyl) esters of maleic acid or fumaric acid or itaconic acid; nitriles of $C_3$ to $C_6$ α,β-monoethylenically unsaturated monocarboxylic and dicarboxylic acids such as acrylonitrile, methacrylonitrile, maleonitrile, fumaronitrile, itacononitrile, amides of $C_3$ to $C_6$ α,β-monoethylenically unsaturated monocarboxylic and dicarboxylic acids such as acrylamide, methacrylamide, fumaramide, maleamide, itaconamide, anhydrides of $C_3$ to $C_6$ α,β-monoethylenically unsaturated dicarboxylic acids such as maleic anhydride. Particular preference is given to using unsaturated carboxylic acids such as acrylic acid, methacrylic acid, itaconic acid, esters of acrylic acid, methacrylic acid, itaconic acid with $C_1$ to $C_{12}$ alkanols such as methyl, ethyl, n-butyl, isobutyl and 2-ethylhexyl esters of acrylic acid, methacrylic acid, dimethyl, diethyl, di-n-butyl, diisobutyl and di(2-ethylhexyl) esters of maleic acid, fumaric acid and itaconic acid, nitriles of acrylic acid, methacrylic acid, itaconic acid, such as methacrylonitrile, acrylonitrile, itacononitrile, amides of acrylic acid, methacrylic acid, itaconic acid, such as acrylamide, methacrylamide, itaconamide.

As component D it is possible to use the following classes of compounds: surface-active substances, initiators, molecular weight regulators, such as chain-transfer agents, pH-regulators, and complexing agents. One example are surface-active substances. Here it is possible to use both protective colloids and emulsifiers. Examples of suitable protective colloids are polyvinyl alcohols, polyethylene glycols, cellulose derivatives or vinylpyrrolidone containing copolymers. A detailed description of further suitable protective colloids can be found in Houben-Weyl, Methoden der organischen Chemie, Volume XIV/1, Makromolekulare Stoffe, [Macromolecular Substances], Georg-Thieme-Verlag, Stuttgart, 1961, pp. 411 to 420. Emulsifiers may be anionic, cationic or nonionic in nature. Customary emulsifiers are, for example, ethoxylated mono-, di- and tri-alkylphenols (EO degree (number of ethylene oxide units): from 3 to 50, alkyl radical: $C_4$ to $C_9$), ethoxylated fatty alcohols (EO degree: from 3 to 50, alkyl radical: $C_8$ to $C_{36}$), and also alkali metal salts and ammonium salts of alkyl sulfates (alkyl radical: $C_8$ to $C_{18}$), of sulfuric monoesters with ethoxylated alkanols (EO degree: from 4 to 30, alkyl radical: $C_{12}$ to $C_{18}$) and with ethoxylated alkyl phenols (EO degree: from 3 to 50, alkyl radical: $C_4$ to $C_9$) of alkyl sulfonic acid (alkyl radical: $C_{12}$ to $C_{18}$) and alkylaryl sulfonic acid (alkyl radical: $C_9$ to $C_{18}$). Further suitable emulsifiers can be found in Houben-Weyl, Methoden der organischen Chemie, Volume XIV/1, Makromolekulare Stoffe, Georg-Thieme-Verlag, Stuttgart, 1961, pages 192 to 208. It is of course also possible to use mixtures of emulsifiers and/or protective colloids. Where mixtures of surface-active substances are used the individual components must of course be compatible with one another, something which in case of doubt can be checked by means of a few preliminary tests. Generally speaking, anionic emulsifiers are compatible with one another and with nonionic emulsifiers. The same applies to cationic emulsifiers, while anionic and cationic emulsifiers are usually incompatible with one another. Examples of further nonionic emulsifiers are found in Ullmann's Encyclopedia of Industrial Chemistry, Fifth, Completely Revised Edition, Volume A9, p.313–p. 314 in Table 1, examples of further anionic emulsifiers are found in Ullmann's Encyclopedia of Industrial Chemistry, Fifth, Completely Revised Edition, Volume A9, p.315–p. 316 in Table 2, further examples of cationic emulsifiers are found in Ullmann's Encyclopedia of Industrial Chemistry, Fifth, Completely Revised Edition, Volume A9, p.317 in Table 3, further amphoteric emulsifiers are found in Ullmann's Encyclopedia of Industrial Chemistry, Fifth, Completely Revised Edition, Volume A9, p. 317 in Table 4, further examples of natural emulsifiers are found in Ullmann's Encyclopedia of Industrial Chemistry, Fifth, Completely Revised Edition, Volume A9, p. 318 in Table 5, further examples of inorganic emulsifiers are found in Ullmann's Encyclopedia of Industrial Chemistry, Fifth, Completely Revised Edition, Volume A9, p. 318 in Table 6, and further examples of polymeric emulsifiers are found in Ullmann's Encyclopedia of Industrial Chemistry, Fifth, Completely Revised Edition, Volume A9, p. 319 in Table 7. Preference is given to emulsifiers such as: ethoxylated fatty alcohols (EO degree: from 3 to 50, alkyl radical: $C_8$ to $C_{36}$), and also alkali metal salts and ammonium salts of alkyl sulfates (alkyl radical: $C_8$ to $C_{18}$), of sulfuric monoesters with ethoxylated alkanols (EO degree: from 4 to 30, alkyl radical: $C_{12}$ to $C_{18}$) and with ethoxylated alkyl phenols (EO degree: from 3 to 50, alkyl radical: $C_4$ to $C_9$) of alkyl sulfonic acid (alkyl radical: $C_{12}$ to $C_{18}$) and alkylaryl sulfonic acid (alkyl radical: $C_9$ to $C_{18}$), particular preference is given to emulsifiers such as: alkali metal salts and ammonium salts of alkyl sulfates (alkyl radical: $C_8$ to $C_{12}$), of sulfuric monoesters with ethoxylated alkanols (EO degree: from 4 to 30, alkyl radical: $C_{12}$ to $C_{18}$) and with ethoxylated alkyl phenols (EO degree: from 3 to 50, alkyl radical: $C_4$ to $C_9$) of alkyl sulfonic acid (alkyl radical: $C_{12}$ to $C_{18}$) and alkylarylsulfonic acid (alkyl radical: $C_9$ to $C_{18}$). In the worked-up end product these surface-active substances may be present within a range from 0.5 to 3% by weight, preferably within the range from 0.5 to 2% by weight, based on the total mass of polymerizable reactants. The amount of surface active substance in the worked-up end product includes all values and subvalues therebetween, especially including 0.7, 0.9, 1.1, 1.3, 1.5, 1.7, 1.9, 2.1, 2.3, 2.5, 2.7 and 2.9% by weight.

Suitable free-radical polymerization initiators include all those capable of triggering a free-radical emulsion polymerization. These are preferably persulfate salts, such as ammonium persulfate, potassium persulfate or sodium persulfate, for example, azo compounds, e.g. 2,2'-azobisisobutyronitrile, and those described in Kirk-Othmer, Encyclopedia of Chemical Technology, Fourth Edition, Volume 14, p. 451–p. 452, Table 9, and organic peroxo compounds. The organic peroxo compounds may be selected from the following group: dialkyl peroxides (examples are given in: Kirk-Othmer, Encyclopedia of Chemical Technology, Fourth Edition, Volume 14, p. 445, Table 6), diacyl peroxides (examples are given in: Kirk-Othmer, Encyclopedia of Chemical Technology, Fourth Edition, Volume 14, p. 440, Table 3), dialkyl peroxydicarbonates (examples are given in: Kirk-Othmer, Encyclopedia of Chemical Technology, Fourth Edition, Volume 14, p. 446, Table 7), tert-alkyl peroxyesters (examples are given in: Kirk-Othmer, Encyclopedia of Chemical Technology, Fourth Edition, Volume 14, p. 442, Table 4), OO-tert-alkyl O-alkyl monoperoxycarbonates (OO-tert-butyl-O-isopropyl monoperoxycarbonate), di(tert-alkylperoxy) ketals (examples are given in: Kirk-Othmer, Encyclopedia of Chemical Technology, Fourth Edition, Volume 14, p. 444, Table 5), di-tert-alkyl peroxides, di-tert-alkyl hydroperoxides (examples are given in: Kirk-Othmer, Encyclopedia of Chemical Technology, Fourth Edition, Volume 14, p. 447, Table 8), ketone peroxides (methyl ethyl ketone peroxide, methyl isobutyl ketone peroxide, cyclohexanone peroxide, 2,4-pentanedione peroxide). It is also possible to use combined systems. In that case at least one persulfate and/or peroxide and/or hydroperoxide are used as initiators. These are combined with a reducing agent. Possible combinations may be the following: peroxide and/or hydroperoxide with the sodium metal salt of hydroxymethanesulfinic acid, with the sodium metal salt of hydroxysulfinatoacetic acid, with the sodium metal salt of hydroxysulfonatoacetic acid, with sodium sulfite, with ascorbic acid, with sodium metabisulfite, and with combinations of these. Combined systems which additionally include a small amount of a metal compound which is soluble in the polymerization medium and whose metallic component is able to exist in a plurality of valence states are also used (e.g. ascorbic acid/iron(II) sulfate/hydrogen peroxide, in which instead of the ascorbic acid it is also possible to use the sodium metal salt of hydroxysulfonatoacetic acid, sodium sulfite, sodium hydrogen sulfite, sodium disulfite, and combinations thereof. Instead of water-soluble Fe(II) salts it is also possible to use combinations of water-soluble Fe/V salts. Instead of hydrogen peroxide it is also possible to use organic peroxides and/or hydroperoxides or alkali metal peroxodisulfates and/or ammonium peroxodisulfate). Initiation with the aid of radiation and photoinitiators is also possible. Possible photoinitiators are given in Kirk-Othmer, Encyclopedia of Chemical Technology, Fourth Edition, Volume 14, p. 455, Table 10, and in: Kirk-Othmer, Encyclopedia of Chemical Technology, Fourth Edition, Volume 14, p. 457, Table 11. Preference is given to initiators based on persulfate salts such as: sodium persulfate, potassium persulfate, ammonium persulfate, organic peroxo compounds, and combinations of peroxides or hydroperoxides with a reducing agent. The organic peroxo compounds may be selected from the following group: dialkyl peroxides (examples are given in: Kirk-Othmer, Encyclopedia of Chemical Technology, Fourth Edition, Volume 14, p. 445, Table 6), diacyl peroxides (examples are given in: Kirk-Othmer, Encyclopedia of Chemical Technology, Fourth Edition, Volume 14, p. 440, Table 3), tert-alkyl peroxyesters (examples are given in: Kirk-Othmer, Encyclopedia of Chemical Technology, Fourth Edition, Volume 14, p. 442, Table 4), di-tert-alkyl peroxides, di-tert-alkyl hydroperoxides (examples are given in: Kirk-Othmer, Encyclopedia of Chemical Technology, Fourth Edition, Volume 14, p. 447, Table 8), ketone peroxides (methyl ethyl ketone peroxide, methyl isobutyl ketone peroxide, cyclohexanone peroxide, 2,4-pentanedione peroxide). It is also possible to use combined systems. In that case at least one persulfate and/or peroxide and/or hydroperoxide are used as initiators. These are combined with a reducing agent. Possible combinations may be the following: peroxide and/or hydroperoxide with the sodium metal salt of hydroxymethanesulfinic acid, with the sodium metal salt of hydroxysulfinatoacetic acid, with the sodium metal salt of hydroxysulfonatoacetic acid, with sodium sulfite, with ascorbic acid, with sodium metabisulfite, and with combinations of these. Combined systems which additionally include a small amount of a metal compound which is soluble in the polymerization medium and whose metallic component is able to exist in a plurality of valence states are also used (e.g. ascorbic acid/iron(II) sulfate/hydrogen peroxide, in which instead of the ascorbic acid it is also possible to use the sodium metal salt of hydroxysulfonatoacetic acid, sodium sulfite, sodium hydrogen sulfite, sodium disulfite, and combinations thereof. Instead of water-soluble Fe(II) salts it is also possible to use combinations of water-soluble Fe/V salts. Instead of hydrogen peroxide it is also possible to use organic peroxides and/or hydroperoxides or alkali metal peroxodisulfates and/or ammonium peroxodisulfate). Particular preference is given to persulfate salts such as sodium persulfate, potassium sulfate, ammonium persulfate. In the worked-up end product these initiators may be present in a range of 0.1–3% by weight, preferably from 0.3 to 2% by weight, based on the overall mass of polymerizable reactants. The amount of free-radical polymerization initiators includes all values and subvalues therebetween, especially including 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, and 2.8% by weight.

Chain transfer reagents may be selected from the following group: mercaptocarboxylic acids and their esters such as: butyl mercaptopropionate, isooctylmercaptopropionic acid, isooctyl mercaptopropionate, mono- or polyhalogenated alkanes such as: bromoform, bromotrichloromethane, carbon tetrachloride, alkyl mercaptans such as, for example, n-dodecyl mercaptan, tertiary-dodecyl mercaptan, octyl mercaptan, tetradecyl mercaptan, hexadecyl mercaptan; monothioglycerol, alkyl thioglycolates such as butylthioglycolate, isooctyl thioglycolate, and dodecyl thioglycolate, thioesters and combinations thereof. Preference is given to mono- or polyhalogenated alkanes such as: bromoform, bromotrichloromethane, carbon tetrachloride, alkyl mercaptans such as, for example, n-dodecyl mercaptan, tertiary-dodecyl mercaptan, octyl mercaptan, tetradecyl mercaptan, hexadecyl mercaptan; particular preference is given to alkyl mercaptans such as, for example, n-dodecyl mercaptan, tertiary dodecyl mercaptan, octyl mercaptan, tetradecyl mercaptan, hexadecyl mercaptan. In the worked-up end product these molecular weight regulators may be present within a range of 0–2% by weight, preferably 0.3–1.5% by weight, based on the overall mass of polymerizable reactants. The amount of molecular weight regulators includes all values and subvalues therebetween, especially including 0.1, 0.2, 0.3, 0.4, 0.5, 0.6, 0.7, 0.8, 0.9, 1.0, 1.1, 1.2, 1.3, 1.4, 1.5, 1.6, 1.7, 1.8 and 1.9% by weight.

For pH adjustment it is possible to use customary bases selected from the following group: hydroxides, carbonates and hydrogen carbonates as salts of alkali metals, alkaline earth metals, and ammonium, such as: LiOH, NaOH, KOH, $Mg(OH)_2$, $Ca(OH)_2$, $NH_4OH$, $LiHCO_3$, $NaHCO_3$, $KHCO_3$, $Mg(HCO_3)_2$, $NH_4HCO_3$, $Ca(HCO_3)_2$, $Li_2CO_3$, $Na_2CO_3$, $K_2CO_3$, $MgCO_3$, $CaCO_3$, $(NH_4)_2CO_3$, $NH_3$ and amines, and mixtures thereof. Preference is given to hydroxides and carbonates as salts of alkali metals, alkaline earth metals and ammonium, such as: LiOH, NaOH, KOH, $Mg(OH)_2$, $Ca(OH)_2$, $NH_4OH$, $Li_2CO_3$, $Na_2CO_3$, $K_2CO_3$, $MgCO_3$, $CaCO_3$, $(NH_4)_2CO_3$ and $NH_3$, and mixtures thereof. Particular preference is given to hydroxides as salts of alkali metals, alkaline earth metals and ammonium such as: LiOH, NaOH, KOH, $Mg(OH)_2$, $Ca(OH)_2$, $NH_4OH$ and $NH_3$ and mixtures thereof. In the worked-up end product these pH regulators may be present in a range from 0 to 2.5% by weight, based on the overall mass of polymerizable reactants. The amount of pH regulators includes all values and subvalues therebetween, especially including 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3 and 2.4% by weight.

Complexing agents are selected from the following group: polyphosphates, aminocarboxylic acids and their single or multiple alkali metal salts, 1,3-diketones, hydroxycarboxylic acids, polyamines, amino alcohols, aromatic heterocyclic bases, phenols, aminophenols, oximes, Schiff bases, tetrapyrroles, sulfur compounds, synthetic macrocyclic components, polymers, phosphonic acids. Examples of these classes of compound can be found in Kirk-Othmer, Encyclopedia of Chemical Technology, Fourth Edition, Volume 5, Table 1, p. 768 to p. 769. Preferably, the compounds are selected from the following group: polyphosphates, aminocarboxylic acids and their single or multiple salts with alkali metals, hydroxycarboxylic acids, synthetic macrocyclic components, phosphonic acids. In the worked-up end product these complexing agents may be present within a range of 0–1.5% by weight, preferably in the range between 0 and 1% by weight, based on the overall masses of polymerizable reactants. The amount of complexing agents includes all values and subvalues therebetween, especially including 0.1, 0.2, 0.3, 0.4, 0.5, 0.6, 0.7, 0.8, 0.9, 1.0, 1.1, 1.2, 1.3 and 1.4% by weight.

The polymerization according to the present invention provides for the preparation of a latex by the gradient method and for the reduction of the amount of 4-PCH. The amount of 4-PCH in the latex is preferably less than 65 ppm, more preferably less than 55 ppm, most preferably less than 45 ppm. The amount of 4-PCH includes all values and subvalues between 0 and 65 ppm especially including 0.5, 1, 5, 10, 15, 20, 25, 30, 35, 40, 45, 50, 55 and 60 ppm.

The emulsion polymerization reaction zone which is utilized in the present invention is any vessel properly equipped for the preparation of emulsion polymers. The different vessels and their suitability for particle emulsion polymerization reaction are well known to the skilled worker. Also needed are at least two primary feed sources which feed directly into the reactor. There may be one or more secondary feed sources connected to the primary feed sources. That is, from these secondary feed sources mixtures or pure substances are conveyed into the primary feed sources. Here, a permanently changing concentration profile of the components relative to one another may be established. The term primary feed source defines one or more sources directly connected to the emulsion polymerization zone. The term secondary feed source defines one or more sources which pass intermediately through a primary source from which they can enter into the emulsion polymerization zone. The term source defines a tank or container, which is preferably equipped with a stirrer in order to ensure thorough mixing of the components, or an on-line mixer. From the primary feed sources, therefore, pure components or mixes of two or more components can enter into the emulsion polymerization zone. The number of secondary sources used is situated in the range between 0 and n (where n is the number of components added during the polymerization). One secondary feed source may also be connected at the same time to a plurality of primary feed sources. The flow rates of the pumps used for this system may be constant during the conveying time or may change once or with permanent continuity.

The continuous decrease in the amount of one component added per unit time with simultaneous continuous increase in the amount of the other component added per unit time means that for one component it is the case that at a given point in time the number of entering moles is greater than at another, later point in time. On the other hand, for the other component the number of entering moles, when these two points in time are compared, has become greater. The amounts added per unit time for the components may move along a descending or ascending straight line or along a descending or ascending 2nd- to 5th-degree polynomial function or along an ascending or descending exponential function. If the amount added per unit time falls for component A, then within the same period it rises for component B. If the amount added per unit time rises for component A, it falls within the same period for component B. The gradient regime may be operated without or with single or multiple reversal of the change in the amounts added per unit time, i.e., such that the sign of the change in the amounts added per unit time changes never or once or two or more times. Before the beginning of the gradient regime one portion of components A and B may be added with a constant change in the amounts added per unit time. This metering concept may be carried out for not more than 50%, preferably for not more than 40% and with particular preference for not more than 35% of the overall monomer feed time.

The reduction in by-product is achieved by avoiding certain molar ratios for the monomers entering into the emulsion polymerization zone. If the molar ratio of the entering monomers possesses a value between the limits of the starting range, a molar ratio within the limits of the target range can be set by changing the amounts of the two components added per unit time. The polymers are prepared by a procedure in which the change in the amounts of the monomers added per unit time prior to the discontinuity is constant within the limits of the starting range. On the other hand, the change in the amounts of the monomers added per unit time prior to the discontinuity is constant or changes within the limits of the target range. If a change in the amount of the two components added per unit time takes place in both ranges, then the amount added per unit time at the first value of the target range is other than at the last value of the starting range, with the exception of the amount added per unit time of the first point of the target range which would result if the amount added per unit time of the starting range were to be continued after the function of the starting range had been chosen. The time required for the transition of the two values of the amounts added per unit time between start point and target point is not more than 5%, preferably not more than 3%, and with particular preference not more than 2% of the monomer feed time. The transition between both values of the amounts of the monomers added to the emulsion polymerization zone per unit time is arbitrary. Possible changes include the following: assimilation of the two values of the amounts of the monomers added to the emulsion polymerization zone per unit time along any desired mathematical function (e.g.: first- to fifth-degree polynomials and/or sinusoidal functions, preferably first- to third-degree polynomials and/or sinusoidal functions, particularly preferable are first degree polynomials and/or sinusoidal functions) or by stopping the amount of the component added per unit time in the starting range and starting the amount of the component added per unit time in the target range. These ranges may be combined with one another in different orders and in different number. The courses of the amounts added to the reactor per unit time may have a form such that in the target range the same amount of the components enters the reactor as in the case that for the target range the courses of the amounts added per unit time were to be continued from the starting range. Through the choice of discontinuity possibilities, the amounts of the entering monomers in the target range may be equal to the amounts of the entering monomers, when for the target range, the amounts added per unit time change in accordance with the same functions as those by which they were also changed in the starting region. For this purpose it may be necessary, after having first changed the amounts of the monomers added per unit time, to change them again but this time the other way round. In other words, for this further discontinuity the amount of one component added per unit time is lowered if it was increased by the preceding discontinuity, and the amount of one component added per unit time is raised if it was lowered by the preceding discontinuity. The ranges described here may be combined with one another in different order and in any desired number.

The point in time of the discontinuity is dependent on the molar ratio of the monomers entering the emulsion polymerization zone. If the molar ratio of the two entering monomers departs the defined ranges of A to B of 0.15–0.95 or 1.05–6.66 (starting range) and 1.05–6.66 or 0.15–0.95 (target range), preferably 0.15–0.85 or 1.18–6.66 (starting range) and 1.18–6.66 or 0.15–0.85 (target range), with particular preference of 0.15–0.8 or 1.25–6.66 (starting range) and 1.25–6.66 or 0.15–0.8 (target range), the amount of the monomers added per unit time is changed in such a way that the ratio of the number of moles of component A entering the reactor to the number of moles of component B entering the reactor is situated again within the range defined above.

After the discontinuity, the amounts of monomers added per unit time may develop as follows: both monomers may continue to be fed with a constant change in the amount added per unit time, or the amounts of both components added per unit time may rise or the amounts of both components added per unit time may fall. The amount of component A added per unit time may fall and that of component B rise, the amount of component A added per unit time may rise and that of component B likewise. The amount of component B added per unit time may fall and that of component A rise, the amount of component B added per unit time may rise and that of component A likewise. The amount of component A added per unit time may be kept constant while the amount of component B added per unit time rises. The amount of component A added per unit time may be kept constant while the amount of component B added per unit time falls. The amount of component B added per unit time may be kept constant while the amount of component A added per unit time falls. The amount of component B added per unit time may be kept constant while the amount of component A added per unit time rises. The falling and rising amounts added per unit time may develop, for example, along a straight line, a second- to fifth-degree polynomial function, and an exponential function. These possibilities may be traversed in arbitrary order and combination.

The feed sources comprise the polymerizable components and also auxiliaries and additives. From at least one of the primary sources at least one polymerizable component is fed. This polymerizable component may be fed either alone or in a mixture with additives, such as for example diluents or solvating agents, color pigments, dispersion or emulsification agents, antioxidants, stabilizers, pH regulators, chain transfer agents, crosslinking agents, initiators or one component of a redox initiator system, etc. The composition of this primary feed source may change permanently if other substances are added from secondary sources. The secondary sources may comprise polymerizable components, diluents or solvating agents, color pigments, dispersion or emulsification agents, antioxidants, stabilizers, pH regulators, chain transfer agents, crosslinking agents, initiators or one component of a redox initiator system, etc. These substances may be present either as pure substances or as a mixture of two or more components. In the course of feeding it must be ensured that a secondary source comprising one component of a redox initiator system is not added to the primary feed source in which the other components of that redox initiator system is present or is added. That would lead to the polymerization of one or more polymerizable components in the primary source and not in the emulsion polymerization zone.

The amounts added per unit time for components C and D may be independent of one another for each of these components and also independent of components A and B, or may be dependent on them. If the amount of the components added per unit time is independent of components A and B, then the amounts added per unit time may be consistently linear or may also change in accordance with any desired mathematical function. Suitable mathematical functions include first- to fifth-degree polynominal functions or sinusoidal functions. Based on the overall entry time of components A and B, components C and D need not be fed throughout this time. It is possible for feeds of components C and D to begin earlier than or at the same time as or later than those of components A and B or else for the feeds of components C and D to end earlier than or at the same time as or later than the feeds of components A and B. Also possible are intermediate interruption and renewed commencement of one or more of these components. Also possible are discontinuities in the amounts of these components C and D added per unit time. The transition between two amounts of components C and/or D added per unit time is arbitrary. Possible changes include the following: assimilation of the two amounts of component C and/or D added per unit time along any desired mathematical function (e.g.: first- to fifth-degree polynomials and/or sinusoidal functions, preferably first- to third-degree polynomials and/or sinusoidal functions, with particular preference first-degree polynomials and/or sinusoidal functions) or by stopping the amount added per unit time possessed by the component in the range which is to be departed and simultaneously starting the amount added per unit time possessed by the component in the range into which transition is to take place.

Before the feeding of the polymerizable components into the emulsion polymerization zone begins, said emulsion polymerization zone may already have within it a mixture comprising solvating agent, dispersion agent or emulsification agent. Also possible is the introduction of a complexing agent, a seed latex and the entirety or portions of the initiator. The composition and preparation of such a seed latex is known to the skilled worker and does not require elaboration here.

The chosen polymerization temperature is dependent on the chosen initiator system and may lie within the range of 5–130° C., preferably in the range of 50–120°, more preferably still in the range of 65–95° C. The temperature may be constant or may vary during the reaction. The polymerization temperature includes all values and subvalues therebetween, especially including 10, 20, 30, 40, 50, 60, 70, 80, 90, 100, 110 and 120° C.

A product prepared by this process may be subjected to any procedure which is known to the skilled worker with the purpose, for example, of removing accompaniments, purifying or concentrating the product, or further processing/refining. The products may also of course be provided with additions of further additives and fillers, such as: pH regulators, complexing agents, surface-active substances, antioxidants, dyes, pigments, plasticizers, vulcanizing agents, vulcanizing accelerators, biocides, fungicides, defoamers.

A latex prepared by this process can be used for all of the field of application in which latices from emulsion polymerizations are employed. It is suitable, for example, as a binder for sheetlike textile structures, papers, as a construction admixture, as a raw material for the production of paints, and as a coating material for consumer goods.

Having generally described this invention, a further understanding can be obtained by reference to certain specific examples which are provided herein for purposes of illustration only, and are not intended to be limiting unless otherwise specified.

EXAMPLES

The vessel used for the following experiments was a 10 liter stainless steel pressure reactor equipped with a stirrer and a heating/cooling jacket. Furthermore the reactor was equipped with a vacuum and a nitrogen supply. The reactor was connected to two primary feed sources at minimum. These primary feed sources are connected to several (1–5, more than 5 are possible, too) secondary feed sources. The temperature, pressure, rotational speed of the stirrer and the feeding rates of the different dosing pumps were registered and controlled by a measure and control system.

The 4-PCH contents in Comparative Example 1 and in Examples 1 and 2 were obtained following extraction of the latex sample with isooctane by GC analysis of the component accumulated in the organic phase. Detection was carried out using an FID (flame ionization detector). The detection limit was 3 mg/kg based on the original sample.

Comparative Example 1 ( compare to Example 1 and 2)

The reactor was charged with 1332.66 g of demineralized water, after which 102.34 g of a seed latex and 0.35 g of EDTA (disodium salt of ethylenediaminetetraacetic acid) were added. The reactor was closed and purged with $N_2$ three times. The mixture was heated to 78° C. and this temperature was kept constant. Then a feed consisting of 35.0 g of ammonium persulfate in solution in 1166.55 g of demineralized water was started. The amount of the solution added per unit time was 2.477 g/min. The starting time of this feed was the time 0 minutes. At time 5 minutes the feed of 3 further components was started simultaneously. The first component consisted of 70.0 g of acrylic acid, 14.0 g of an alkylbenzene sulfonate and 1125.95 g of demineralized water. The amount of the solution added per unit time was 3.361 g/min. The second component consisted of 1645.0 g of butadiene. The amount of butadiene added per unit time started at 7.311 g/min and was reduced continuously over 360 minutes to an amount of butadiene added per unit time of 1.828 g/min. The third component consisted of 612.5 g of styrene and 12.95 g of tertiary-dodecyl mercaptan. The amount of mixture added per unit time was started at 2.030 g/min and was raised continuously up until time 185 minutes to an amount of mixture added per unit time of 4.915 g/min.

At time 185 minutes the feed consisting of 612.5 g of styrene and 12.95 g of tertiary-dodecyl mercaptan ended. At time 185 minutes the feed of a further component was started. The feed consisted of 1137.5 g of styrene and 6.3 g of tertiary-dodecyl mercaptan. The amount of mixture added per unit time was started at 4.915 g/min and was increased continuously up until time 365 minutes to an amount of mixture per unit time of 7.799 g/min.

At time 365 minutes the feeds of the solution of acrylic acid, alkylbenzene sulfonate and demineralized water, butadiene and the mixture of styrene and tertiary-dodecyl mercaptan was stopped. At time 485 minutes the feed of the ammonium persulfate solution was stopped. At time 485 minutes 23.975 g of sodium hydroxide in solution in 215.8 g of demineralized water were added. At time 545 minutes the reactor was cooled. The latex obtained in this way possessed a solid content of 47.3% and a 4-PCH content of 69 ppm.

Example 1 ( according to the present invention)

The reactor was charged with 1332.66 g of demineralized water, and then 102.34 g of a seed latex and 0.35 g of EDTA were added. The reactor was closed and purged with $N_2$ three times. The mixture was heated to 78° C. and this temperature was kept constant. Then a feed consisting of 35.0 g of ammonium persulfate in solution in 1166.55 g of demineralized water was started. The amount of solution added per unit time was 2.477 g/min. The point in time at which this feed was started was the time 0 minutes.

At time 5 minutes the feed of 3 further components was started simultaneously. The first component consisted of 70.0 g of acrylic acid, 14.0 g of alkylbenzenesulfonate and 1125.95 g of demineralized water. The amount of solution added per unit time was 3.361 g/min. The second component consisted of 1645.0 g of butadiene. The amount of butadiene added per unit time was started at 7.311 g/min and was reduced continuously up until time 210 minutes to an amount of butadiene added per unit time of 4.189 g/min. The third component consisted of 612.5 g of styrene and 12.95 g of tertiary-dodecyl mercaptan. The amount of mixture added per unit time was started at 2.030 g/min and was raised continuously up until time 185 minutes to an amount of mixture added per unit time of 4.915 g/min.

At time 185 minutes the feed consisting of 612.5 g of styrene and 12.95 g of tertiary-dodecyl mercaptan ended. At time 185 minutes the feed of a further component was started. This feed consisted of 1137.5 g of styrene and 6.3 g of tertiary-dodecyl mercaptan. The amount of mixture added per unit time was started at 4.915 g/min and was increased continuously up until time 210 minutes to an amount of mixture added per unit time of 5.315 g/min.

At time 210 minutes the amount of butadiene added per unit time was reduced from 4.189 g/min to 2.760 g/min. Starting from an amount of butadiene added per unit time of 2.760 g/min the amount of butadiene added per unit was then lowered continuously again up until time 270 minutes to an amount of butadiene added per unit time of 1.847 g/min. At time 210 minutes the amount of styrene/tertiary-dodecyl mercaptan mixture added per unit time was raised from 5.315 g/min to an amount of styrene/tertiary-dodecyl mercaptan mixture added per unit time of 8.066 g/min. Starting from an amount of styrene/tertiary-dodecyl mercaptan mixture added per unit time of 8.066 g/min the amount of styrene/tertiary-dodecyl mercaptan mixture added per unit time was then increased continuously again up until time 270 minutes to an amount of styrene/tertiary-dodecylmercaptan mixture added per unit time of 9.027 g/min.

At time 270 minutes the amount of butadiene added per unit time was raised from 1.847 g/min to an amount of butadiene added per unit time of 4.703 g/min. Starting from this amount of butadiene added per unit time, of 4.703 g/min, the amount of butadiene added per unit time was then lowered again continuously up until time 330 minutes to an amount of butadiene added per unit time of 3.789 g/min. At time 270 minutes the amount of styrene/tertiary-dodecyl mercaptan mixture added per unit time was lowered from 9.027 g/min to an amount of mixture added per unit time of 3.527 g/min. Starting from this amount of the mixture added per unit time, of 3.527 g/min, the amount of the mixture added per unit time was then raised again continuously up until time 330 minutes to an amount of mixture added per unit time of 4.488 g/min.

At time 330 minutes the amount of butadiene added per unit time was lowered from 3.789 g/min to an amount of butadiene added per unit time of 2.361 g/min. Starting from this amount of butadiene added per unit time, of 2.361 g/min, the amount of butadiene added per unit time was then lowered again continuously up until time 365 minutes to an amount of butadiene added per unit time of 1.828 g/min. At time 330 minutes the amount of styrene/tertiary-dodecyl mercaptan mixture added per unit time was raised from 4.488 g/min to an amount of mixture added per unit time of 7.238 g/min. Starting from this amount of the mixture added per unit time, of 7.238 g/min, the amount of the mixture added per unit time was then raised again continuously up until time 365 minutes to an amount of mixture added per unit time of 7.799 g/min.

At time 365 minutes the feeds of butadiene, the styrene/tertiary-dodecyl mercaptan mixture, and the mixture of acrylic acid, alkylbenzenesulfonate and demineralized water were stopped.

At time 485 minutes the feed of the aqueous solution of ammonium persulfate was stopped.

At time 485 minutes 23.98 g of sodium hydroxide in solution in 215.6 g of demineralized water were added.

At time 545 minutes the reactor was cooled. The latex obtained in this way possessed a solids content of 46.9% and a 4-PCH content of 65 ppm.

Example 2 ( according to the present invention)

The reactor was charged with 1332.66 g of demineralized water, and then 102.34 g of a seed latex and 0.35 g of EDTA were added. The reactor was closed and purged with $N_2$ three times. The mixture was heated to 78° C. and this temperature was kept constant. Then a feed consisting of 35.0 g of ammonium persulfate in solution 1166.55 g of demineralized water was started. The amount of solution added per unit time was 2.477 g/min. The point in time at which this feed was started was the time 0 minutes.

At time 5 minutes the feed of 3 further components was started simultaneously. The first component consisted of 70.0 g of acrylic acid, 14.0 g of alkylbenzene sulfonate and 1125.95 g of demineralized water. The amount of solution added per unit time was 3.361 g/min. The second component consisted of 1645.0 g of butadiene. The amount of butadiene added per unit time was started at 7.311 g/min and was reduced continuously up until time 175 minutes to an amount of butadiene added per unit time of 4.722 g/min. The third component consisted of 612.5 g of styrene and 12.95 g of tertiary-dodecyl mercaptan. The amount of styrene/tertiary-dodecyl mercaptan mixture added per unit time was started at 2.030 g/min and was raised continuously up until time 175 minutes to an amount of mixture added per unit time of 4.754 g/min.

At time 175 minutes the amount of butadiene added per unit time was lowered from 4.722 g/min to an amount of butadiene added per unit time of 2.469 g/min. Starting from this amount of butadiene added per unit time, of 2.469 g/min, the amount of butadiene added per unit time was continuously lowered further up until time 270 minutes to an amount of butadiene added per unit time of 1.022 g/min. At time 175 minutes the amount of styrene/tertiary-dodecyl mercaptan mixture added per unit time was raised from 4.754 g/min to an amount of mixture added per unit time of 9.092 g/min. Starting from this amount of the mixture added per unit time, of 9.092 g/min, the amount of the mixture added per unit time was then raised continuously again up until time 185 minutes to an amount of mixture added per unit time of 9.252 g/min. At time 185 minutes the feed consisting of 612.5 g of styrene and 12.95 g of tertiary-dodecyl mercaptan ended.

At time 185 minutes a further component was started. This consisted of 1137.5 g of styrene and 6.3 g of tertiary-dodecyl mercaptan. The amount of mixture added per unit time was started at 9.252 g/min and was raised continuously up until time 270 minutes to an amount of mixture added per unit time of 10.614 g/min.

At time 270 minutes the amount of butadiene added per unit time was raised from 1.022 g/min to an amount of butadiene added per unit time of 5.528 g/min. Starting from this amount of butadiene added per unit time, of 5.528 g/min, the amount of butadiene added per unit time was then lowered again continuously up until time 365 minutes to an amount of butadiene added per unit time of 4.081 g/min. At time 270 minutes the amount of styrene/tertiary-dodecyl mercaptan mixture added per unit time was lowered from 10.614 g/min to an amount of mixture added per unit time of 1.939 g/min. Starting from this amount of the mixture added per unit time, of 1.939 g/min, the amount of the mixture added per unit time was then raised again continuously up until time 365 minutes to an amount of mixture added per unit time of 3.622 g/min.

At time 365 minutes the feeds of butadiene, the styrene/tertiary-dodecyl mercaptan mixture, and the mixture of acrylic acid, alkylbenzenesulfonate and demineralized water were stopped.

At time 485 minutes the feed of the aqueous solution of ammonium persulfate was stopped.

At time 485 minutes 23.98 g of sodium hydroxide in solution in 215.6 g of demineralized water were added.

At time 545 minutes the reactor was cooled. The latex obtained in this way had a solids content of 47.2% and a 4-PCH content of 58 ppm.

The 4-PCH content in Comparative Example 2 and in Example 3 was determined on a medium-polarity capillary column with helium carrier gas, a temperature gradient, and detection by FID (flame ionization detector). Prior to injection, the sample was diluted with water. Quantification took place against an external standard. The detection limit was 10 mg/kg.

Comparative Example 2 ( compare to example 3)

The reactor was charged with 1332.1 g of demineralized water, and then 102.9 g of a seed latex and 0.35 g of EDTA were added. The reactor was closed and purged with $N_2$ three times. The mixture was heated to 78° C. and this temperature was kept constant. Then a feed consisting of 35.0 g of ammonium persulfate in solution 966.0 g of demineralized water was started. The amount of solution added per unit time was 2.064 g/min. The point in time at which this feed was started was the time 0 minutes.

At time 5 minutes the feed of 3 further components was started simultaneously. The first component consisted of 70.0 g of acrylic acid, 14.0 g of an alkylbenzene sulfonate and 1326.5 g of demineralized water. The amount of solution added per unit time was 3.918 g/min. The second component consisted of 1225.0 g of butadiene. The amount of butadiene added per unit time was started at 5.444 g/min and was lowered continuously up until time 365 minutes to an amount of butadiene added per unit time of 1.361 g/min. The third component consisted of 759.5 g of styrene and 11.375 g of tertiary-dodecyl mercaptan. The amount of styrene/tertiary-dodecyl mercaptan mixture added per unit time was started at 2.489 g/min and was raised continuously up until time 185 minutes to an amount of mixture added per unit time of 6.076 g/min.

At time 185 minutes the feed consisting of 759.5 g of styrene and 11.375 g of tertiary-dodecyl mercaptan ended. At time 185 minutes the feed of a further component was started. This feed consisted of 1410.5 g of styrene and 6.125 g of tertiary-dodecyl mercaptan. The amount of mixture added per unit time was started at 6.076 g/min and was increased continuously up until time 365 minutes to an amount of mixture added per unit time of 9.664 g/min.

At time 365 minutes the feeds of butadiene, the styrene/tertiary-dodecyl mercaptan mixture, and the mixture of acrylic acid, alkylbenzenesulfonate and demineralized water were stopped.

At time 485 minutes the feed of the aqueous solution of ammonium persulfate was stopped.

At time 485 minutes 23.98 g of sodium hydroxide in solution in 215.8 g of demineralized water were added.

At time 545 minutes the reactor was cooled. The latex obtained in this way had a solids content of 47.6% and a 4-PCH content of 75 ppm.

Example 3 ( according to the present invention)

The reactor was charged with 1315.64 g of demineralized water, and then 124.61 g of a seed latex and 0.35 g of EDTA were added. The reactor was closed and purged with $N_2$ three times. The mixture was heated to 78° C. and this temperature was kept constant. Then a feed consisting of 35.0 g of ammonium persulfate in solution in 966.0 g of demineralized water was started. The amount of solution added per unit time was 2.064 g/min. The point in time at which this feed was started is the time 0 minutes.

At time 5 minutes the feed of 3 further components was started simultaneously. The first component consisted of 70.0 g of acrylic acid, 14.0 g of an alkylbenzene-sulfonate and 1326.50 g of demineralized water. The amount of solution added per unit time was 3.918 g/min. The second component consisted of 1225.0 g of butadiene. The amount of butadiene added per unit time was started at 5.444 g/min and was reduced continuously up until time 195 minutes to an amount of butadiene added per unit time of 4.327 g/min. The third component consisted of 595.39 g of styrene and 8.79 g of tertiary-dodecyl mercaptan. The amount of styrene/tertiary-dodecyl mercaptan mixture added per unit time was started at 2.451 g/min and was raised up until time 185 minutes to an amount of mixture added per unit time of 4.239 g/min.

At time 185 minutes the feed consisting of 595.39 g of styrene and 8.79 g of tertiary-dodecyl mercaptan ended.

At time 185 minutes a further component was started. This consisted of 1569.37 g of styrene and 8.72 g of tertiary-dodecyl mercaptan. The amount of styrene/tertiary-dodecyl mercaptan mixture added per unit time was started at 4.239 g/min and was raised continuously up until time 195 minutes to an amount of mixture added per unit time of 4.322 g/min.

At time 195 minutes the amount of butadiene added per unit time was lowered from 4.327 g/min to an amount of butadiene added per unit time of 2.137 g/min. Starting from this amount of butadiene added per unit time, of 2.137 g/min, the amount of butadiene added per unit time was then reduced continuously again up until time 365 minutes to an amount of butadiene added per unit time of 1.352 g/min. At time 195 minutes the amount of the styrene/tertiary-dodecyl mercaptan mixture added per unit time was raised from an amount of mixture added per unit time of 4.322 g/min to an amount of mixture added per unit time of 8.436 g/min. Starting from this amount of the mixture added per unit time, of 8.436 g/min, the amount of the mixture added per unit time was then raised again continuously up until time 365 minutes to an amount of mixture added per unit time of 9.654 g/min.

At time 365 minutes the feeds of butadiene, the styrene/tertiary-dodecyl mercaptan mixture, and the mixture of acrylic acid, alkylbenzenesulfonate and demineralized water were stopped.

At time 485 minutes the feed of the aqueous solution of ammonium persulfate was stopped.

At time 485 minutes 23.98 g of sodium hydroxide in solution in 215.6 g of demineralized water were added.

At time 545 minutes the reactor was cooled. The latex obtained in this way had a solids content of 47.3% and a 4-PCH content of 63 ppm.

German patent application 10247051.0 filed Oct. 9, 2002, and any references or patents cited in this application are incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A latex obtained by reacting
   A) 30–90% by weight of at least one ethylenically unsaturated monomer;
   B) 70–10% by weight of a diene;
   C) 1–10% by weight of α,β-unsaturated carboxylic acids, carboxylic acid nitriles, carboxylic acid amides, esters of $C_3$ to $C_6$ α,β-monoethylenically unsaturated monocarboxylic acids with $C_1$ to $C_{12}$ alkanols, esters of $C_3$ to $C_6$ α,β-monoethylenically unsaturated dicarboxylic acids with $C_1$ to $C_{12}$ alkanols, anhydrides of $C_3$ to $C_6$ α,β-monoethylenically unsaturated monocarboxylic acids, anhydrides of $C_3$ to $C_6$ α,β-monoethylenically unsaturated dicarboxylic acids or mixtures thereof; and
   D) at least one of an auxiliary and an additive;
   wherein % by weight is based on the total weight of A, B and C;
   wherein said reacting follows a gradient regime for components A and B;
   wherein, in said gradient regime, an amount added per unit time of one of components A or B continuously increases, while simultaneously an amount added per unit time continuously decreases for one of components A or B which does not undergo the continuous increase;
   with the proviso that a starting molar ratio of A to B is adjusted from a range of 0.15–0.95 or 1.05–6.66 through at least one discontinuous change in the amount added per unit time to a target molar ratio of A to B, in the range of 1.05–6.66 or 0.15–0.95, and thereafter the change in the amount added per unit time is made
   i) constantly for A and B, and/or
   ii) decreasingly for A and ascendingly for B, and/or
   iii) decreasingly for B and ascendingly for A,
   in any sequence, individually or in combination.

2. The latex as claimed in claim 1, wherein component A is selected from the group consisting of $C_2$ to $C_{20}$ alkenes, functionalized vinyl compounds, $C_5$ to $C_{20}$ alkadienes having isolated double bonds, $C_5$ to $C_{20}$ alkatrienes having isolated double bonds, $C_5$ to $C_{20}$ cycloolefins, vinyl-substituted aromatics, α,β-monoethylenically unsaturated carboxylic acids, nitriles of α,β-monoethylenically unsaturated carboxylic acids, amides of α,β-monoethylenically unsaturated carboxylic acids, anhydrides of α,β-monoethylenically unsaturated carboxylic acids, $C_1$ to $C_{20}$ alkyl esters of acrylic acid, $C_1$ to $C_{20}$ alkyl esters of methacrylic acid, $C_6$ to $C_{20}$ aryl esters of acrylic acid and $C_6$ to $C_{20}$ aryl esters of methacrylic acid.

3. The latex as claimed in claim 2, wherein component A comprises vinylaromatics.

4. The latex as claimed in claim 3, wherein component A comprises styrene.

5. The latex as claimed in claim 1, wherein component B is selected from the group consisting of $C_4$ to $C_{20}$ dienes having conjugated double bonds.

6. The latex as claimed in claim 1, wherein component B comprises butadiene.

7. The latex as claimed in claim 1, wherein component C is selected from the group consisting of $C_3$ to $C_6$ α,β-monoethylenically unsaturated monocarboxylic acids, $C_3$ to $C_6$ α,β-monoethylenically unsaturated dicarboxylic acids, amides of $C_3$ to $C_6$ α,β-monoethylenically unsaturated monocarboxylic acids, amides of $C_3$ to $C_6$ α,β-monoethylenically unsaturated dicarboxylic acids, nitriles of $C_3$ to $C_6$ α,β-monoethylenically unsaturated monocarboxylic acids, and nitriles of $C_3$ to $C_6$ α,β-monoethylenically unsaturated dicarboxylic acids.

8. The latex as claimed in claim 1, wherein component C comprises acrylic acid, acrylonitrile, acrylamide, methacrylic acid, itaconic acid or mixtures thereof.

9. The latex as claimed in claim 1, wherein D is at least one selected from the group consisting of surface-active substances, initiators, molecular weight regulators, pH regulators, complexing agents, and mixtures thereof.

10. The latex as claimed in claim 1, wherein before the beginning of said gradient regime a portion of components A and B is metered in with constant linearity.

11. The latex as claimed in claim 1, wherein, before said starting molar ratio of A to B or said target molar ratio of A to B is reached, the gradient regime operates without or with single or multiple reversal of a change in the amount added per unit time of A and B.

12. The latex as claimed in claim 1, wherein there are two, three or four discontinuous changes in the amount added per unit time.

13. The latex as claimed in claim 1, wherein said reacting takes place at a temperature of from 5 to 130° C.; and
wherein said temperature is constant during said reacting; or
wherein said temperature varies during said reacting.

14. The latex as claimed in claim 1, wherein component C is run in with a constant and/or with a decreasing and/or an increasing change in the amount added per unit time and any desired combinations thereof and dependently or independently of the amount added per unit time of components A and B.

15. The latex as claimed in claim 1, wherein component D is run in with a constant and/or with a decreasing and/or an increasing change in the amount added per unit time and any desired combinations thereof and dependently or independently of the amount of components A and B added per unit time.

16. The latex according to claim 1, wherein 4-phenylcyclohexene is present in an amount of from 58 to 63 ppm.

17. The latex according to claim 1, wherein 4-phenylcyclohexene is present in an amount of 58 ppm or less.

18. An article coated with the latex according to claim 1.

19. A process for preparing a latex, comprising:
reacting
A) 30–90% by weight of at least one ethylenically unsaturated monomer;
B) 70–10% by weight of a diene;
C) 1–10% by weight of α,β-unsaturated carboxylic acids, carboxylic acid nitriles, carboxylic acid amides, esters of $C_3$ to $C_6$ α,β-monoethylenically unsaturated monocarboxylic acids with $C_1$ to $C_{12}$ alkanols, esters of $C_3$ to $C_6$ α,β-monoethylenically unsaturated dicarboxylic acids with $C_1$ to $C_{12}$ alkanols, anhydrides of $C_3$ to $C_6$ α,β-monoethylenically unsaturated monocarboxylic acids, anhydrides of $C_3$ to $C_6$ α,β-monoethylenically unsaturated dicarboxylic acids or mixtures thereof; and
D) at least one of an auxiliary and an additive;
wherein % by weight is based on the total weight of A, B and C;
wherein said reacting follows a gradient regime for components A and B;
wherein, in said gradient regime, an amount added per unit time of one of components A or B continuously increases, while simultaneously an amount added per unit time continuously decreases for one of components A or B which does not undergo the continuous increase;
with the proviso that a starting molar ratio of A to B is adjusted from a range of 0.15–0.95 or 1.05–6.66 through at least one discontinuous change in the amount added per unit time to a target molar ratio of A to B, in the range of 1.05–6.66 or 0.15–0.95, and thereafter the change in the amount added per unit time is made
i) constantly for A and B, and/or
ii) decreasingly for A and ascendingly for B, and/or
iii) decreasingly for B and ascendingly for A,
in any sequence, individually or in combination.

20. The process according to claim 19, wherein component A is selected from the group consisting of $C_2$ to $C_{20}$ alkenes, functionalized vinyl compounds, $C_5$ to $C_{20}$ alkadienes having isolated double bonds, $C_5$ to $C_{20}$ alkatrienes having isolated double bonds, $C_5$ to $C_{20}$ cycloolefins, vinyl-substituted aromatics, α,β-monoethylenically unsaturated carboxylic acids, nitriles of α,β-monoethylenically unsaturated carboxylic acids, amides of α,β-monoethylenically unsaturated carboxylic acids, anhydrides of α,β-monoethylenically unsaturated carboxylic acids, $C_1$ to $C_{20}$ alkyl esters of acrylic acid, $C_1$ to $C_{20}$ alkyl esters of methacrylic acid, $C_6$ to $C_{20}$ aryl esters of acrylic acid and $C_6$ to $C_{20}$ aryl esters of methacrylic acid.

21. The process according to claim 19, wherein component A comprises vinylaromatics.

22. The process according to claim 19, wherein component A comprises styrene.

23. The process according to claim 19, wherein component B is selected from the group consisting of $C_4$ to $C_{20}$ dienes having conjugated double bonds.

24. The process according to claim 19, wherein component B comprises butadiene.

25. The latex as claimed in claim 19, wherein component C is selected from the group consisting of $C_3$ to $C_6$ α,β-monoethylenically unsaturated monocarboxylic acids, $C_3$ to $C_6$ α,β-monoethylenically unsaturated dicarboxylic acids, amides of $C_3$ to $C_6$ α,β-monoethylenically unsaturated monocarboxylic acids, amides of $C_3$ to $C_6$ α,β-monoethylenically unsaturated dicarboxylic acids, nitriles of $C_3$ to $C_6$ α,β-monoethylenically unsaturated monocarboxylic acids, and nitriles of $C_3$ to $C_6$ α,β-monoethylenically unsaturated dicarboxylic acids.

26. The process according to claim 19, wherein component C comprises acrylic acid, acrylonitrile, acrylamide, methacrylic acid, itaconic acid or mixtures thereof.

27. The process according to claim 19, wherein D is at least one selected from the group consisting of surface-active substances, initiators, molecular weight regulators, pH regulators, complexing agents, and mixtures thereof.

28. The process according to claim 19, wherein said reacting takes place at a temperature of from 5 to 130° C.

* * * * *